United States Patent
Patton et al.

(10) Patent No.: US 9,853,580 B2
(45) Date of Patent: Dec. 26, 2017

(54) METHOD OF CONTROLLING START-UP NOISE IN BLDC (BRUSHLESS DIRECT CURRENT) FAN MOTORS

(71) Applicant: Apple Inc., Cupertino, CA (US)

(72) Inventors: Brad Lee Patton, Campbell, CA (US); Anthony Joseph Aiello, Santa Cruz, CA (US); Jesse T. Dybenko, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 108 days.

(21) Appl. No.: 14/205,135

(22) Filed: Mar. 11, 2014

(65) Prior Publication Data

US 2014/0265963 A1   Sep. 18, 2014

Related U.S. Application Data

(60) Provisional application No. 61/785,525, filed on Mar. 14, 2013.

(51) Int. Cl.
*H02P 6/10* (2006.01)
*H02P 6/20* (2016.01)
*H02P 27/08* (2006.01)
*F04D 25/06* (2006.01)

(52) U.S. Cl.
CPC .............. *H02P 6/20* (2013.01); *H02P 27/085* (2013.01); *F04D 25/0613* (2013.01)

(58) Field of Classification Search
CPC ............. H02P 8/18; H02P 25/088; H02P 6/10
USPC ........................... 318/400.23, 400.24, 400.25
See application file for complete search history.

(56) References Cited

U.S. PATENT DOCUMENTS

| | | | | |
|---|---|---|---|---|
| 5,003,252 A | * | 3/1991 | Nystrom | G01R 31/34 324/765.01 |
| 5,684,376 A | * | 11/1997 | Neiger | H02M 1/44 318/107 |
| 5,923,133 A | * | 7/1999 | Menegoli | G11B 19/20 318/400.19 |
| 2006/0181232 A1 | * | 8/2006 | Oljaca | G06F 1/206 318/268 |

(Continued)

OTHER PUBLICATIONS

Kyle Gaede, Suppressing Acoustic Noise in PWM Fan Speed Control Systems, 2003, Microchip, AN771, pp. 1-6.*

(Continued)

*Primary Examiner* — Bickey Dhakal
(74) *Attorney, Agent, or Firm* — Kilpatrick Townsend & Stockton

(57) ABSTRACT

A method to reduce acoustic noise in a cooling fan motor is disclosed. The method includes reducing the slew rate of a PWM (pulse width modulation) voltage waveform applied to energize a coil of the fan motor. This slew rate reduction results in lower mechanical vibrations and acoustic noise in the fan motor. In one embodiment, the slew rate reduction is performed during startup of the fan motor, when the motor is spinning slowly and there is little air flow noise. In another embodiment, the slew rate reduction is not performed during high speed operation of the fan motor, when the fan motor is spinning very fast and air flow noise masks the motor noise. In one embodiment, there is variable slew rate control depending on the speed of the fan motor.

16 Claims, 10 Drawing Sheets

(56) References Cited

U.S. PATENT DOCUMENTS

| | | | | |
|---|---|---|---|---|
| 2009/0251096 A1* | 10/2009 | Schulz | .................... | H02P 6/10 |
| | | | | 318/801 |
| 2011/0051357 A1* | 3/2011 | Orr | ........................ | G06F 1/20 |
| | | | | 361/679.48 |
| 2011/0260668 A1* | 10/2011 | Mourrier | .................. | H02P 7/29 |
| | | | | 318/503 |

OTHER PUBLICATIONS

Microchip, Suppressing Acoustic Noise in PWM Fan Speed Control Systems, 2003, pp. 1-6.*

* cited by examiner

Slew rate for a given rise time of a pulse

METHOD OF CONTROLLING START-UP NOISE IN BLDC (BRUSHLESS DIRECT CURRENT) FAN MOTORS

CROSS-REFERENCE TO RELATED APPLICATIONS

This application claims priority to U.S. Provisional Application No. 61/785,525, filed Mar. 14, 2013 and entitled "METHOD OF CONTROLLING START-UP NOISE IN BLDC (BRUSHLESS DIRECT CURRENT) FAN MOTORS", which is incorporated herein in its entirety by reference.

FIELD

The described embodiments relate generally to a method for reducing acoustic noise in computing system and more particularly to a method for reducing acoustic noise in cooling fan motors of computing system by controlling the voltage slew rate during startup and high speed operation of the fan motors.

BACKGROUND

In the field of fan design for laptop computers, optimization for low acoustic output is a growing focus. For example, high acoustic noise can be produced during fan motor startup, when the fan transitions from an "off state" where it is silent to a working state. During fan motor startup, relatively large forces must be applied in order to overcome rotor inertia. Interactions between the permanent magnet of the rotor and the energized coils of the stator of a BLDC (brushless direct current) motor can result in violent, impulsive vibrations that are transferred to the fan housing. This, in turn, creates high acoustic noise, which can be alarming and unpleasant to users. Therefore, what is desired is a method to reduce acoustic noise of fan motors, especially during motor startup.

SUMMARY

A method to reduce acoustic noise in a cooling fan motor is disclosed. The method includes reducing a slew rate of a PWM (pulse width modulation) voltage waveform applied to energize a coil of a fan motor, such as a BLDC (brushless direct current) fan motor. This slew rate reduction results in lower mechanical vibrations and acoustic noise in the fan motor. In one embodiment, the slew rate reduction is performed during startup of the fan motor, when the motor is stopped or spinning slowly and there is little air flow noise. In another embodiment, the slew rate reduction is not performed during high speed operation of the fan motor, when the fan motor is spinning very fast and air flow noise masks the motor noise. In one embodiment, there is variable slew rate control depending on the speed of the fan motor.

In one embodiment, a method to reduce an acoustic noise in a fan motor is disclosed. The method includes reducing the slew rate of a voltage waveform applied to the fan motor. The reduction of the slew rate results in lower mechanical vibrations and lower acoustic noise in the fan motor. In one embodiment, the voltage waveform is a PWM (pulse width modulation) voltage waveform. In one embodiment, the PWM voltage waveform is applied to energize a coil of the fan motor. In one embodiment, reducing the slew rate of the PWM voltage waveform is performed during a startup of the fan motor when the fan motor is stopped or spinning slowly. In one embodiment, reducing the slew rate of the PWM voltage waveform is not performed during a high speed operation of the fan motor when the fan motor is spinning at higher speeds. In one embodiment, reducing the slew rate of the PWM voltage waveform significantly abates an audible noise generated during startup of the fan motor or when the fan motor is spinning slowly. Further, the audible noise is due to significant time spacing between pulses of the PWM voltage waveform. In one embodiment, the fan motor is a BLDC (brushless direct current) fan motor. In one embodiment, reducing the slew rate of the PWM voltage waveform is implemented using a motor control IC (integrated circuit). In one embodiment, the method further includes enabling a filter during the startup of the fan motor when the fan motor is spinning slowly and disabling the filter during the high speed operation of the fan motor when the fan motor is spinning at higher speeds. In one embodiment, the motor control IC includes a FET (field effect transistor). In one embodiment, the filter is comprised of a resistor and a capacitor configured to control the voltage applied to a gate of the FET.

In one embodiment, a second method to reduce an acoustic noise in a fan motor is disclosed. The second method includes variably reducing a slew rate of a voltage waveform applied to the fan motor depending on a speed of the fan motor. The reduction of the slew rate results in lower mechanical vibrations and lower acoustic noise in the fan motor. In one embodiment, the voltage waveform is a PWM (pulse width modulation) voltage waveform. In one embodiment, the PWM voltage waveform is applied to energize a coil of the fan motor. In one embodiment, to variably reduce the slew rate of the PWM voltage waveform, the slew rate of the PWM voltage waveform is reduced by a smaller amount when the speed of the fan motor is increased. In one embodiment, the variably reduced slew rate is reduced by a maximum value when the speed of the fan motor is at a low rpm (revolutions per minute). In one embodiment, the variably reduced slew rate is reduced by a minimum value when the speed of the fan motor is at a high rpm (revolutions per minute).

In one embodiment, an apparatus for reducing an acoustic noise in a fan motor is disclosed. The apparatus includes a motor controller for controlling a slew rate of a PWM (pulse width modulation) voltage waveform applied to the fan motor. The reduction of the slew rate results in lower mechanical vibrations and lower acoustic noise in the fan motor. In one embodiment, the apparatus further includes a coil of the fan motor. The PWM voltage waveform is applied to energize the coil. In one embodiment, the motor controller reduces the slew rate of the PWM voltage waveform during startup of the fan motor when the fan motor is spinning slowly. In one embodiment, the motor controller increases the slew rate of the PWM voltage waveform during high speed operation of the fan motor when the fan motor is spinning at higher speeds. In one embodiment, the motor controller variably reduces the slew rate of the PWM voltage waveform depending on a speed of the fan motor.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
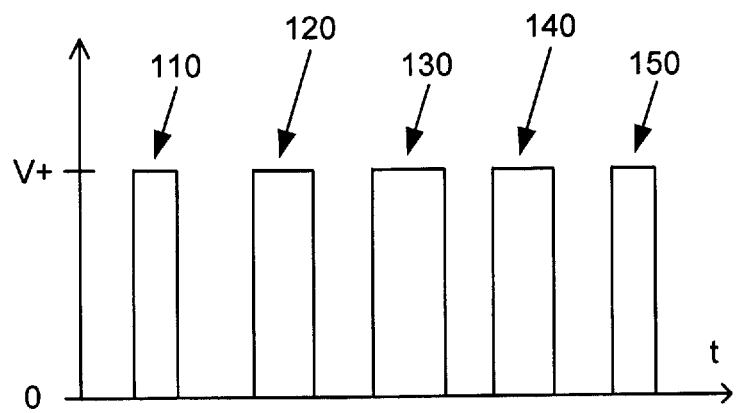
FIG. 1 illustrates a PWM (pulse width modulation) waveform of a fixed voltage with variable pulse width, which can be used to energize a motor coil, in accordance with some example embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

In the field of fan design for electronic devices (such as laptop computers, desktop computers, and consumer electronic devices), many techniques exist to help minimize acoustic output. However, producing the best solution requires consideration of all techniques. One overlooked aspect of motor control for fans is the regulation of voltage slew rate as it is applied to parts of the fan motor, such as the motor coils. This is of utmost importance during motor startup, when relatively large forces must be applied in order to overcome rotor inertia. Startup is also a time when the fan transitions from an "off state" where it is silent to a working state where airflow noise may mask motor related noises. As such, in one embodiment, this disclosure describes a method to control voltage slew rate during motor startup so as to minimize impulse vibration and the associated acoustic response.

It has been observed that high slew rate of voltage applied to motor coils can be the main cause of strong, impulsive vibrations that are transmitted to the fan housing. In one embodiment, these vibrations can originate from interactions between the permanent magnet of the rotor and the energized coils of the stator of a BLDC motor. The magnetic properties of the rotor's permanent magnet are fixed when the motor is produced, so the magnetic field associated with the rotor's permanent magnet do not change significantly with time. As such, the electromagnetic field generated by the motor coils in order to move the rotor can result directly from the voltage waveform applied to the motor coils.

In modern motor control, PWM (pulse width modulation) of a fixed voltage can be used to produce a waveform shape of the current in the motor coils. In one embodiment, a PWM signal is a digital square wave, where the frequency is constant, but the fraction of the time the signal is on (i.e., the duty cycle) can be varied between 0 and 100%. With a 0% duty cycle, the signal is never turned on. With a 100% duty cycle, the signal is always turned on. With a 50% duty cycle, the signal is on 50% of the time and off 50% of the time. By controlling the sequence of pulse-widths applied to a coil, virtually any shape of current waveform can be manufactured.

FIG. 1 illustrates a PWM waveform of a fixed voltage with variable pulse width, which can be used to energize a motor coil, in accordance with some example embodiments. In the PWM waveform of FIG. 1, all the pulse amplitudes are the same (i.e., equal to fixed voltage V+), but the pulse widths can be varied to build a current waveform of any shape in the motor coil. For example, by varying the pulse width chain or the pulse width event, a triangular current waveform, a saw tooth current waveform, a sinusoidal current waveform, or a square current waveform can be formed in the motor coil.

In particular, FIG. 1 shows a PWM waveform with five voltage pulses: 110, 120, 130, 140, and 150. It can be seen that the PWM waveform of FIG. 1 has variable pulse width, because three different pulse widths are shown. Voltage pulses 110 and 150 have a first pulse width. Voltage pulses 120 and 140 have a second pulse width, while voltage pulse 130 has a third pulse width.

Figure 2A:
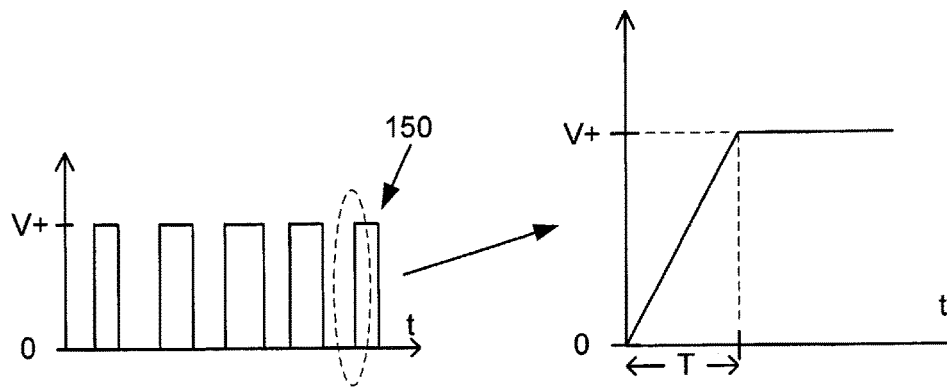
FIG. 2A illustrates the slew rate for a given rise time of a pulse, in accordance with some example embodiments.
Figure 2B:
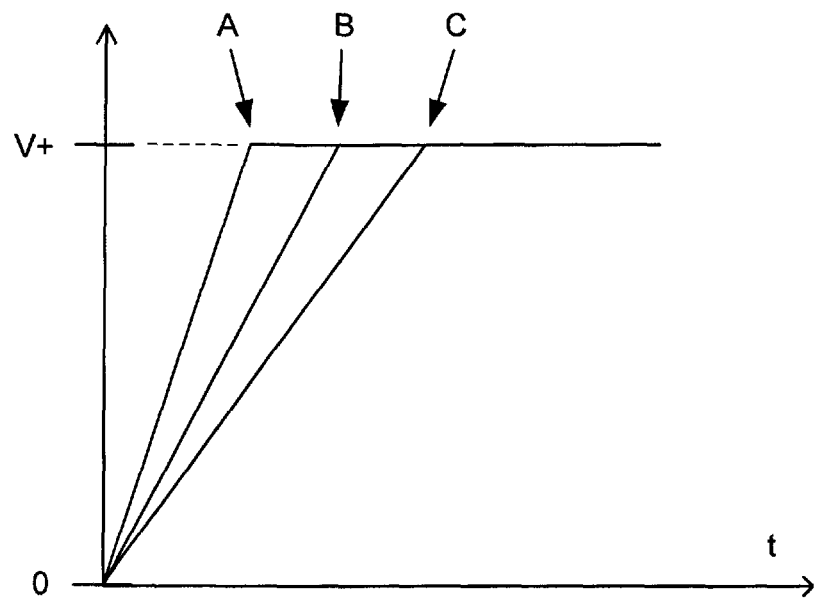
FIG. 2B illustrates three different slew rates that are possible by varying the amount of rise time, in accordance with some example embodiments.

In order to achieve good acoustic performance and minimize vibration, the motor can use a PWM waveform that results in a sinusoidal current waveform in the motor coil. However, the rise time and fall time of the PWM pulses can also have a significant impact on the level of vibrations produced during motor drive which, in turn, lead to acoustic noise. In particular, the rate of voltage change, which is known as the slew rate, can affect the amount of vibration and noise produced by the motor. As an example, the slew rate for a given rise time of a pulse is shown in FIG. 2A, which is a blow up view for one of the pulses (i.e., pulse 150) shown in FIG. 1. In FIG. 2A, the slew rate is equal to $$\frac{V+}{T},$$

where T is a rise time of pulse 150. For the rise time shown in FIG. 2A, it can be seen that the voltage rises from zero to V+. FIG. 2B illustrates different slew rates that are possible by varying the amount of rise time. In FIG. 2B, pulse A has the highest slew rate, while pulse C has the lowest slew rate. Pulse B has a slew rate that is in between. It can be shown that a high slew rate (e.g., pulse A, where the voltage rises very sharply) produces more noise and more vibration as opposed to a low slew rate (e.g., pulse C, where the voltage rises more slowly).

It is not shown, but similarly, a slew rate can be calculated for a given fall time of a pulse, where the voltage drops from V+ to zero. For the fall time, the slew rate is equal to $$\frac{V+}{T},$$

where T is a fall time of the pulse.

The voltage rises illustrated in FIGS. 2A and 2B are shown as a straight line with a constant slope, but in general a voltage rise, as well as a voltage fall, can be a curve and not a straight line. In that embodiment, the instantaneous slew rate can be expressed as a derivative of the voltage with respect to time, and shown as a slope of a tangent to the curve that exhibits the voltage rise or fall.

A high acoustical noise level can result from a high slew rate because the high slew rate of voltage applied to motor coils can be a primary cause of violent, impulsive vibrations that are transferred to the fan housing. For example, in a BLDC (brushless direct current) motor, these vibrations can originate from interactions between the permanent magnet of the rotor and the energized coils of the stator of a BLDC motor. In normal usage, the magnetic properties of the rotor's permanent magnet are fixed at the time of production and hence do not vary significantly with time. Conversely, the electromagnetic field produced by the motor coils in order to move the rotor can be a direct result and extension of the voltage waveform applied to them. With a high slew rate, the electromagnetic field changes very rapidly, resulting in strong vibrations that translate into a high acoustical noise level. Due to the very short duration time of the voltage change, the induced vibration pulse can excite a wide range of frequencies, including many of the structural resonances in the system, and can therefore be especially detrimental to acoustic performance. This is an important point about a possible root cause of noise associated with these pulses. The shorter the slew rate, the closer the pulse approaches to an "ideal impulse". Mathematically, ideal impulses can excite an infinite frequency range, where an "ideal impulse" is defined as a pulse of zero width time and infinite amplitude (i.e., the mathematical limit of shortening a pulse's width, while maintaining constant area under the curve).

In one embodiment with a BLDC motor, the root cause of acoustic noise is vibration induced by oscillating EM (electromagnetic) forces of a stator acting against the mass of a PM (permanent magnet) rotor. These forces are the largest at startup in order to overcome inertia. Rigid mounting of stator to motor support plate is an efficient transmitter of this vibration. A large, thin motor support plate mimics a speaker cone. In one embodiment, the large, thin motor support plate can be reshaped to lessen the effects of the speaker cone. Magnetic center offset of stator and PM exacerbates the issue by introducing forces into the axial direction. In one embodiment, the motor can be modified to reduce force in the axial direction. Magnetostriction may also be a minor contributor to the vibration and noise.

Figure 3:
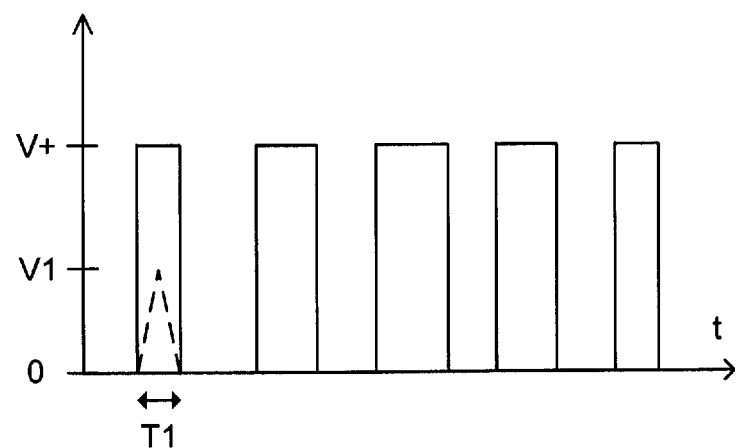
FIG. 3 illustrates that the pulse amplitude and the pulse width can set a lower limit on the slew rate, in accordance with some example embodiments.

Therefore, it would be desirable to use a slower slew rate to minimize the acoustic noise. However, there are real limitations as to how slowly the voltage edge can rise or fall. For example, a low slew rate can result in lower efficiency for the motor, but it is possible to select a compromise, a median slew rate which achieves good acoustical benefits without spoiling the motor efficiency. As another example, if a very low slew rate is used, it is possible that the voltage will not be able to reach the desired pulse amplitude of V+, but instead only reach a lower voltage V1, as shown in FIG. 3 in dashed lines. Therefore, the pulse amplitude and the minimum pulse width can set a lower limit on the slew rate.

From FIG. 3, it can be seen that the desired pulse amplitude (i.e., V+) and the pulse width (i.e., time T1) can set a lower limit on the minimum slew rate possible (Please note that the instantaneous slew rate can approach zero, so this is a minimum "average" slew rate that assumes the voltage rises or falls as a straight line with a constant slope.). For example, if the voltage pulse fall has a negligible fall time (i.e., fall time is almost zero), then all the pulse width can be applied to the rise time. This will yield a lower limit of $$\frac{V+}{T1}$$

for the "average" slew rate. On the other hand, if the voltage pulse fall has a non-negligible fall time, then the pulse width has to be shared between the rise time and fall time. If it is assumed that the rise time is equal to the fall time, then the "average" slew rate for both the voltage rise and the voltage fall will have a lower limit of $$\frac{2V+}{T1}.$$

Another possible real limitation is related to the inherent inductance and resistance of a motor coil. A motor coil has an inherent inductance value, which is typically very large, and an inherent resistance value, which is relatively small. Combined, these characteristics define the time constant of natural response of the coil to an applied voltage. This is defined by the equation:

$$t = \frac{L}{R}$$

where t=natural response time constant
L=coil inherent inductance (in henry)
R=coil inherent resistance (in ohm)

Theoretically, the best acoustic performance would occur when the slew rate of the voltage waveform has less than or equal to 5 times the LR (inductor resistor) time constant, which is the natural response of the LR (inductor resistor) circuit. However, it has been observed that any improvement to the rising/falling voltage slew rate can have a positive influence on the acoustic output. Additionally, the 5t (5 times t, the natural response time constant) value for motor coils is quite long when compared to the minimum PWM pulse width and, as such, becomes impractical from an efficiency standpoint. Therefore, in the embodiment of a BLDC motor for a cooling fan, the typical limit of the lowest slew rate would be controlled by the pulse amplitude and the minimum pulse width as shown in FIG. 3.

Figure 4:
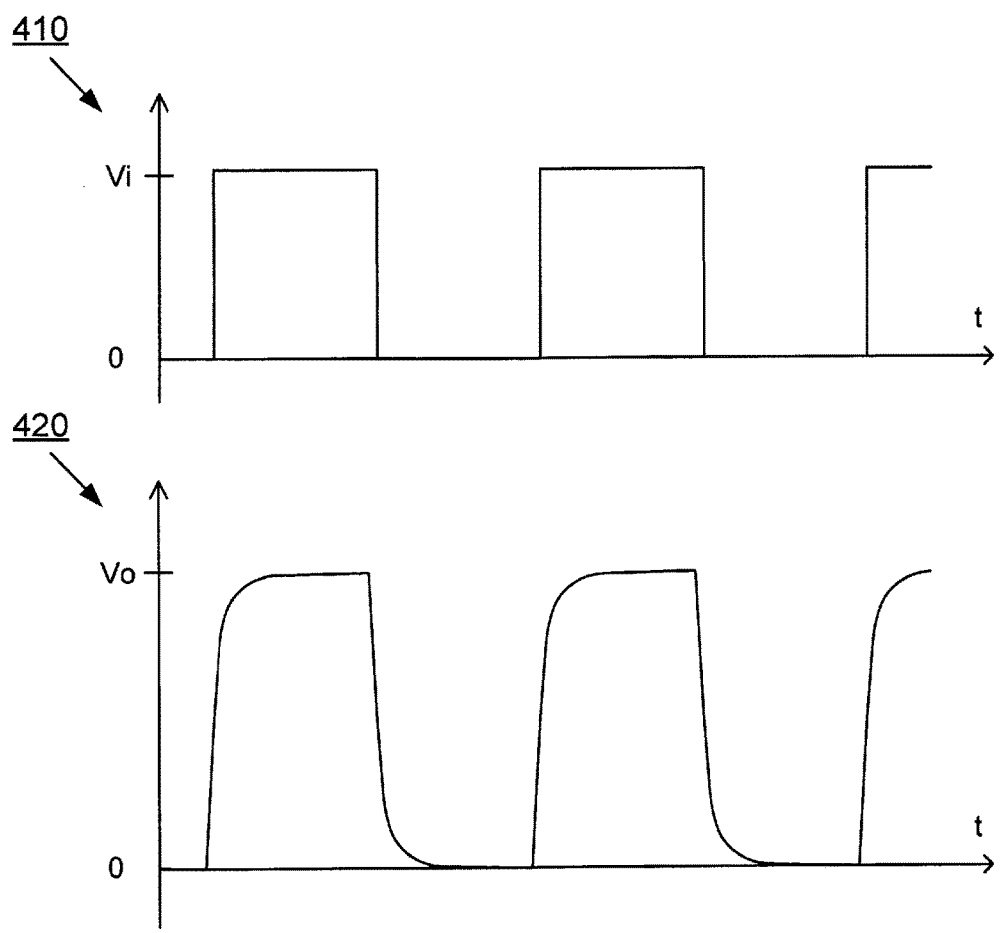
FIG. 4 illustrates a non-slew rate controlled input signal (Vi) that can generate a slew rate controlled output signal (Vo) for reducing acoustic noise, in accordance with some example embodiments.

FIG. 4 shows an embodiment of how slew rates of pulse voltage rise/fall can be reduced to minimize the acoustic noise. In particular, FIG. 4 illustrates a non-slew rate controlled input signal (Vi) that can generate a slew rate controlled output signal (Vo) for reducing acoustic noise, in accordance with some example embodiments. An input signal (Vi) 410 is shown as a square wave pulse. The input signal (Vi) 410 has no slew rate reduction (i.e., non-slew rate controlled), so the acoustic noise is not reduced. The input signal (Vi) 410 can be used to generate an output signal (Vo) 420. The output signal (Vo) 420 is shown as a modified square wave pulse, where some corners of the square wave pulse have been rounded, because the slew rates of both the voltage rise and the voltage fall have been reduced. The output signal (Vo) 420 has slew rate reduction (i.e., slew rate controlled), so the acoustic noise is reduced. FIG. 4 is shown as one embodiment of how slew rates of pulse voltage rise/fall can be reduced, so other slew rate reduced (i.e., slew rate controlled) embodiments are also possible.

Most, if not all, BLDC fan motor controllers have two fundamental modes of operation: open-loop startup and closed-loop RPM control (i.e., normal running operation). In the first mode of open-loop startup, the motor is just starting to spin, so there are very little or no aerodynamic noises associated with moving air. As such, at startup or lower rpm (revolutions per minute), motor noises are most noticeable. In the second mode of closed-loop RPM control (i.e., normal running operation), the motor can be spinning at a higher rpm at which the air flow noise or aerodynamic noise tends to mask a lot of the inherent motor noises. Therefore, there is a greater need to reduce the motor noise at startup. Additionally, reducing the motor noise through slew rate control can have the undesirable effect of lower efficiency, since lower slew rate corresponds to lower efficiency. Therefore, it can be desirable to run the motor with a higher slew rate at high rpm, when the aerodynamic noises can mask the inherent motor noises. Under normal running operation, the motor is usually running at high speed (i.e., high rpm), so air flow noise is masking inherent motor noises. However, the motor can also be in a "low speed" running operation, where the motor is spinning at a lower rpm, so the noise conditions for this mode can be more like that of the startup operation, where the inherent motor noises dominate the air flow noises.

Yet another consideration is that the operation of a computer that extends the battery life can often allow the fan motor to shut off during normal user interactions with the computer. Then, every time when the fan motor is turned back on, that can result in an audible clicking noise that might be noticeable to the user. It is, therefore, important for the user to not hear strange noises, such as the above audible clicking noise, which might alarm the user. Such an audible clicking noise can be generated when there is significant time spacing between pulses of the PWM voltage waveform due to events such as the fan motor shutting off and turning back on during normal user interactions with the computer to save battery life. During these turn back on events, the fan motor is spinning at low rpm. Therefore, there is a need to reduce motor noise at startup or low rpm.

Acoustic noise reduction in a fan motor can be achieved by reducing the slew rate of a PWM (pulse width modulation) voltage waveform applied to energize a motor coil of the fan motor. This slew rate reduction can result in lower mechanical vibrations and lower acoustic noise in the fan motor. In one embodiment, this slew rate reduction can be activated during a startup of the fan motor. For a BLDC fan motor, this would correspond to the open-loop startup mode of operation. In another embodiment, this slew rate reduction can be activated during a high speed running operation of the fan motor. For a BLDC fan motor, this can correspond to the closed-loop RPM control mode of operation. In yet another embodiment, this slew rate reduction can be activated during both startup and high speed running operation of the fan motor. As further example, this slew rate reduction can be activated during low speed running operation of the fan motor, or during both startup and low speed running operation of the fan motor.

Figure 5:
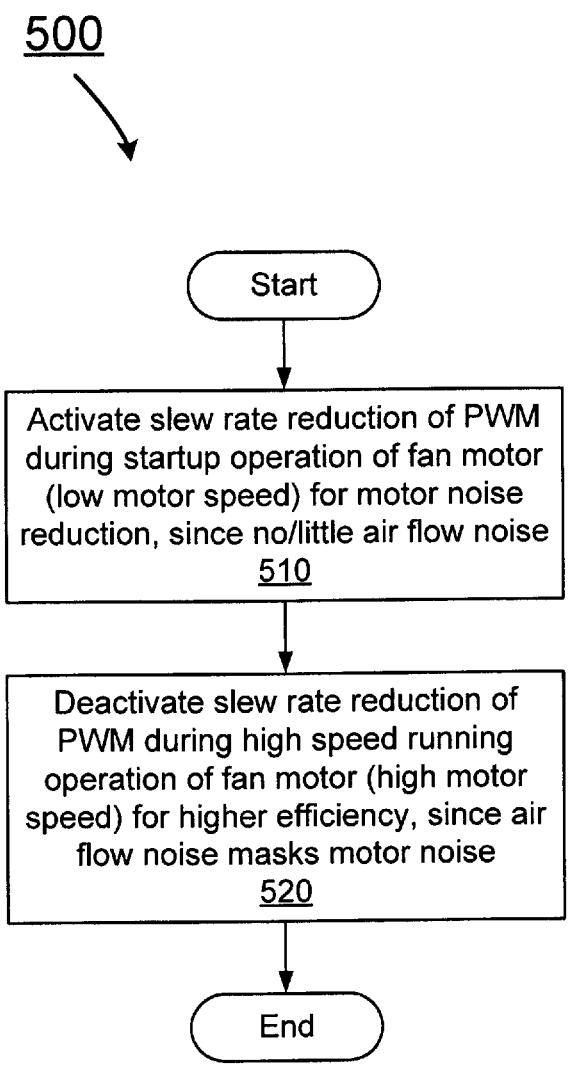
FIG. 5 illustrates a flow chart of method steps for slew rate control to reduce acoustic noise, in accordance with some example embodiments.
Figure 6:
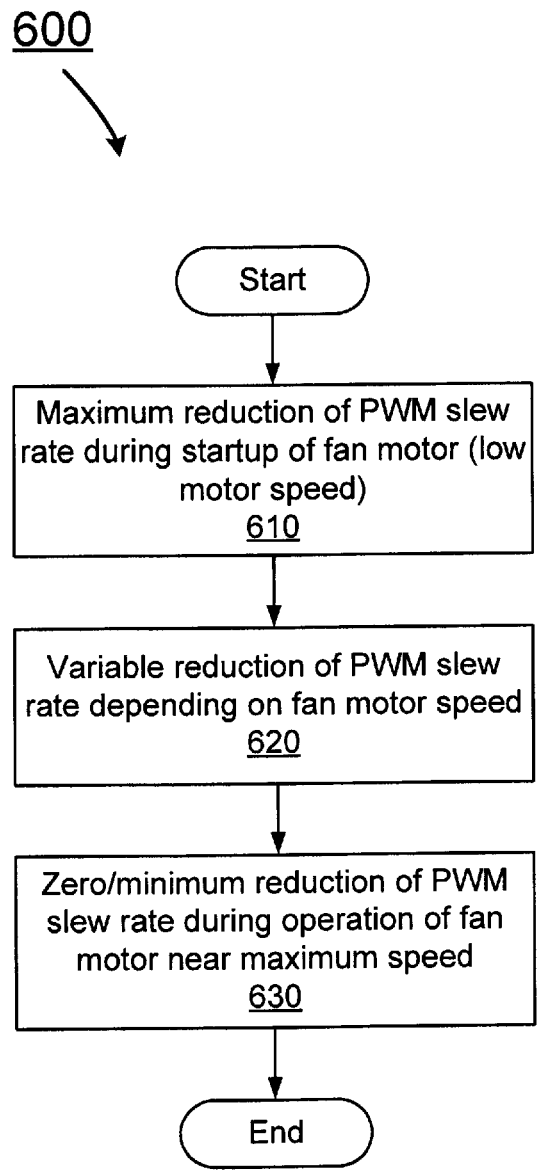
FIG. 6 illustrates a flow chart of method steps for variable slew rate control to reduce acoustic noise that depends on the fan motor speed, in accordance with some example embodiments.

However, reducing the slew rate can have the undesirable effect of making the motor operate less efficiently. For example, a square wave pulse, which has a very high slew rate, is more efficient but, at the same time, also noisier. Therefore, one approach can be to only reduce the slew rate (i.e., lower slew rate) during the startup sequence and then go back to a sharper rise time (i.e., higher slew rate) for the high rpm mode of running operation. In one embodiment, the slew rate reduction can be applied differently for different modes of operation. This can mean having slew rate control at different operating modes of the fan. For example, FIG. 5 shows that slew rate control can be activated during open-loop mode of startup, and then deactivated during the high rpm mode of running operation. Another approach can be variable slew rate control depending on the speed of the fan motor. This is shown in FIG. 6. At very low speed, during the startup mode, the fan is spinning at very low rpm. In another embodiment, the fan can be spinning at very low rpm (i.e., low power consumption), because it is trying to save battery life. At very low rpm, there is very little air flow noise, so most of the noise is coming from the fan motor. In this low speed startup mode, it would be more advantageous to apply a less efficient, lower slew rate for better acoustic performance related to reduced mechanical vibration and noise from the fan motor. On the other hand, at very high speed, when it is critical for the fan to reach a higher rpm, the fan motor needs to be operating at maximum efficiency. In this high speed running operation mode, it would be more advantageous to apply a more efficient, higher slew rate, because there is not going to be an acoustic tradeoff for better acoustic performance, since the fan motor noise is masked by the air flow noise. In one embodiment, this more efficient, higher slew rate can correspond to a square wave pulse, which has a sharp voltage rise and a sharp voltage fall.

In particular, FIG. 5 illustrates a flow chart of method steps for slew rate control to reduce acoustic noise, in accordance with some example embodiments. As shown in FIG. 5, the method 500 begins at step 510, where the method activates a slew rate reduction of PWM during startup operation of fan motor (i.e., low motor speed) for motor noise reduction, since there is no or little air flow noise. Then, at step 520, the method deactivates the slew rate reduction of PWM during high speed running operation of fan motor (i.e., high motor speed) for higher efficiency, since air flow noise masks motor noise. In one embodiment, the slew rate reduction process can be activated as soon as the fan motor is turned on. Then, as the fan motor gains speed and the fan begins to spin at a high rpm, the slew rate reduction can be gradually deactivated in one embodiment, or abruptly deactivated in another embodiment. In one embodiment, this deactivation can occur when the fan motor has reached a maximum speed. In another embodiment, this deactivation can occur when the fan motor has reached a predetermined speed. In both of these embodiments, the method can further include another device to detect the speed of the fan motor. In yet another embodiment, this deactivation can occur when the fan motor has reached a certain noise level. Accordingly, in that embodiment, the method can include a device to detect the noise level of the fan motor and fan, so that the deactivation can occur when the fan motor has reached the certain noise level.

It is possible to carry out variable slew rate control that depends on the speed of the fan motor in various manners. In one embodiment, the slew rate is variably reduced depending on the speed of the fan motor. In one embodiment, the slew rate is reduced by a smaller quantity when the speed of the fan motor is increased. Therefore, a low rpm would result in a high slew rate reduction, while a high rpm would result in a low or zero slew rate reduction. In one embodiment, the slew rate reduction can be a maximum value when the fan motor is at low rpm, and the slew rate reduction can be a minimum value or zero when the fan motor is at high rpm.

In particular, FIG. 6 illustrates a flow chart of method steps for variable slew rate control to reduce acoustic noise that depends on the fan motor speed, in accordance with some example embodiments. As shown in FIG. 6, the method 600 begins at step 610, where the method can provide a maximum reduction of PWM slew rate during startup of the fan motor (i.e., low motor speed), when there is no or little air flow noise. After step 610, the method proceeds to step 620, where the method can provide variable reduction of PWM slew rate depending on the fan motor speed. Then the method proceeds to step 630, where the method can provide zero or minimum reduction of PWM slew rate during operation of the fan motor near maximum speed (i.e., high motor speed). In step 630, a high motor speed can generate air flow noise that masks the motor noise, so the motor can tolerate a higher PWM slew rate, which can provide for the benefit of higher efficiency. Accordingly, in another embodiment, step 630 of method 600 can provide zero or minimum reduction of PWM slew rate during operation of the fan motor at speeds above a threshold where air flow noise masks motor noise.

In one embodiment, step 620 of method 600 can reduce the PWM slew rate by a smaller amount when the speed of the fan motor is increased. This means that there is a maximum reduction of the PWM slew rate when the fan motor speed is at a minimum (i.e., zero motor speed), and a minimum reduction (or no reduction) of PWM slew rate when the fan motor speed is at a maximum (i.e., high motor speed). In another embodiment, there is a minimum reduction (or no reduction) of the PWM slew rate when the fan motor speed is above a threshold where air flow noise masks motor noise. In one embodiment, the amount of PWM slew rate reduction can be directly proportional to the motor speed. Accordingly, in that embodiment, the method can include another device to detect the speed of the fan motor. In another embodiment, the amount of PWM slew rate reduction relative to the motor speed can be adjusted so that the amount of fan and fan motor noise is minimized. Accordingly, in that embodiment, the method can include a device to detect the noise level of the fan motor and fan, so that the noise level can be minimized.

Actual slew rate control can be implemented in various ways. For example, slew rate control can be implemented through a motor control IC (integrated circuit) that has a programmable or configurable slew rate control either through firmware setting or through use of external components. In this disclosure, a 3-phase, motor control implementation is presented as an example.

In any 3-phase motor control implementation there can exist an array of FETs (field effect transistor) which control the application of voltage to the coils. As such, the slew rate is controlled by how these FETs are turned on and off. These switching components of a motor controller can be included within the motor controller IC if the package can dissipate enough power and/or the FETs are rated for low enough carrying current. In other implementations, the FETs are discrete devices that are located external to the motor control IC but controlled by that IC. As described previously, most motor controllers have two modes of operation (i.e., startup and running operation) and the controller knows which mode is active at any one time. Accordingly, a signal is available, or can be easily derived, that distinguishes between these two modes. Furthermore, as an example, running operation can have a high speed mode and a low speed mode.

In one embodiment, a typical 3-phase BLDC motor control IC can include six FETs. Accordingly, the slew rate is controlled by the turning on and off of these six FETs. In one embodiment, these FETs can be power MOSFETs (metal-oxide-semiconductor field-effect transistors). In one embodiment, these FETs can be DMOS (double-diffused metal-oxide-semiconductor).

One method to increase slew rate is to build a filter with a resistor and a capacitor to control the voltage applied to the gate of the FETs. In one embodiment, this filter would be enabled during the startup sequence and bypassed during high speed running operation. This technique has the benefit of using an RC (resistor capacitor) network to provide a slew rate which closely matches the natural response of the coil's LR (inductor resistor). In another embodiment, a resistor and a capacitor can provide a time constant that is interpreted by a motor control IC and used for switching the FETs. In one embodiment, the resistor and the capacitor can be internal. In another embodiment, the resistor and the capacitor can be external. In yet another embodiment, one can be internal while the other can be external.

Another method is to utilize an op-amp based slew rate control to drive the gates of the FETs. Again, in one embodiment, this circuit can be utilized during startup and bypassed in high speed running operation. For the op-amp based slew rate control, either a single op-amp or a series of op-amps can be used to turn on or off the FETs.

In one embodiment, an intelligent fan motor design can take the PWM frequency of the coil beyond the human hearing range. As an example, the PWM frequency can be selected to be from 25 kHz to 30 kHz, since the human hearing range is typically from 20 Hz to 20 kHz. Setting the PWM frequency beyond the human hearing range can eliminate acoustic artifacts from coil vibrations and other first order effects.

Figure 7:
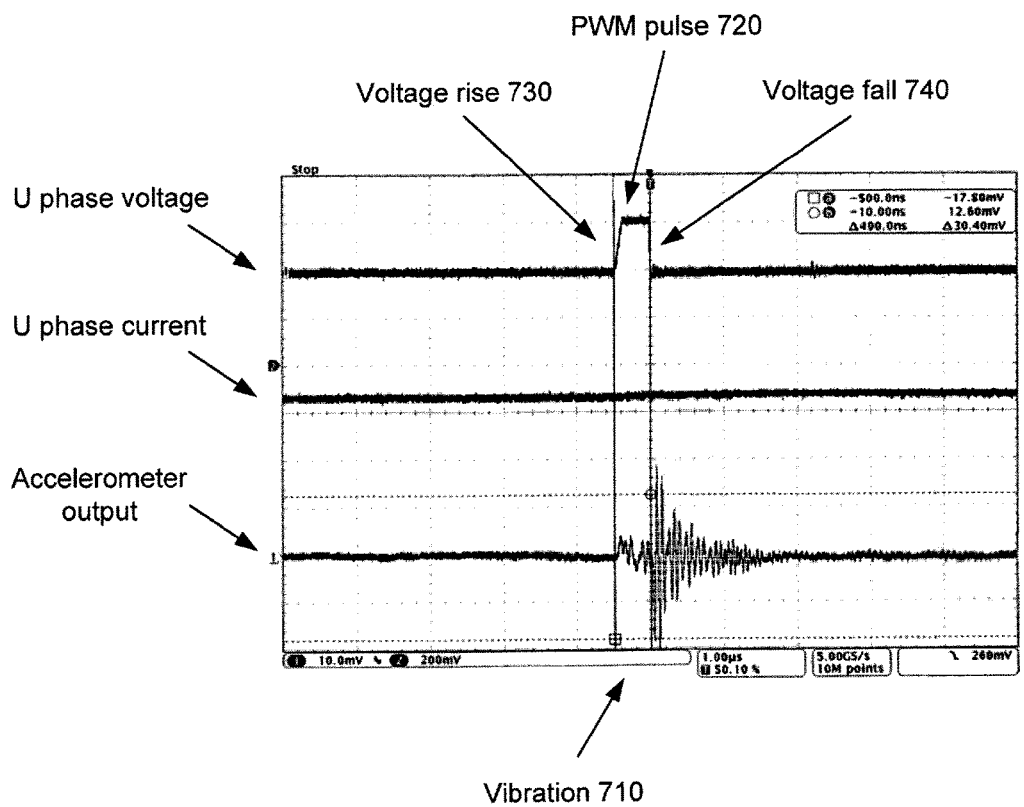
FIG. 7 illustrates that strong vibrations produced during motor drive can be attributed to the rise time and fall time of a PWM pulse, in accordance with some example embodiments.

FIG. 7 illustrates that strong vibrations produced during motor drive can be attributed to the voltage rise and voltage fall of a PWM pulse. An accelerometer attached to a motor is used to detect mechanical vibrations produced during motor drive. In FIG. 7, mechanical vibrations appearing as ringing oscillations in the accelerometer output are labeled as vibration 710. In a 3-phase motor, the 3 phases can be labeled as U, V, and W phase. In FIG. 7, a PWM pulse 720 of the U phase voltage can be seen triggering vibration 710. In particular, the voltage rise 730 and voltage fall 740 of PWM pulse 720 can be seen triggering vibration 710. Additionally, the higher slew rate of the voltage fall 740 can be seen triggering stronger vibrations than the lower slew rate of the voltage rise 730.

Figure 8:
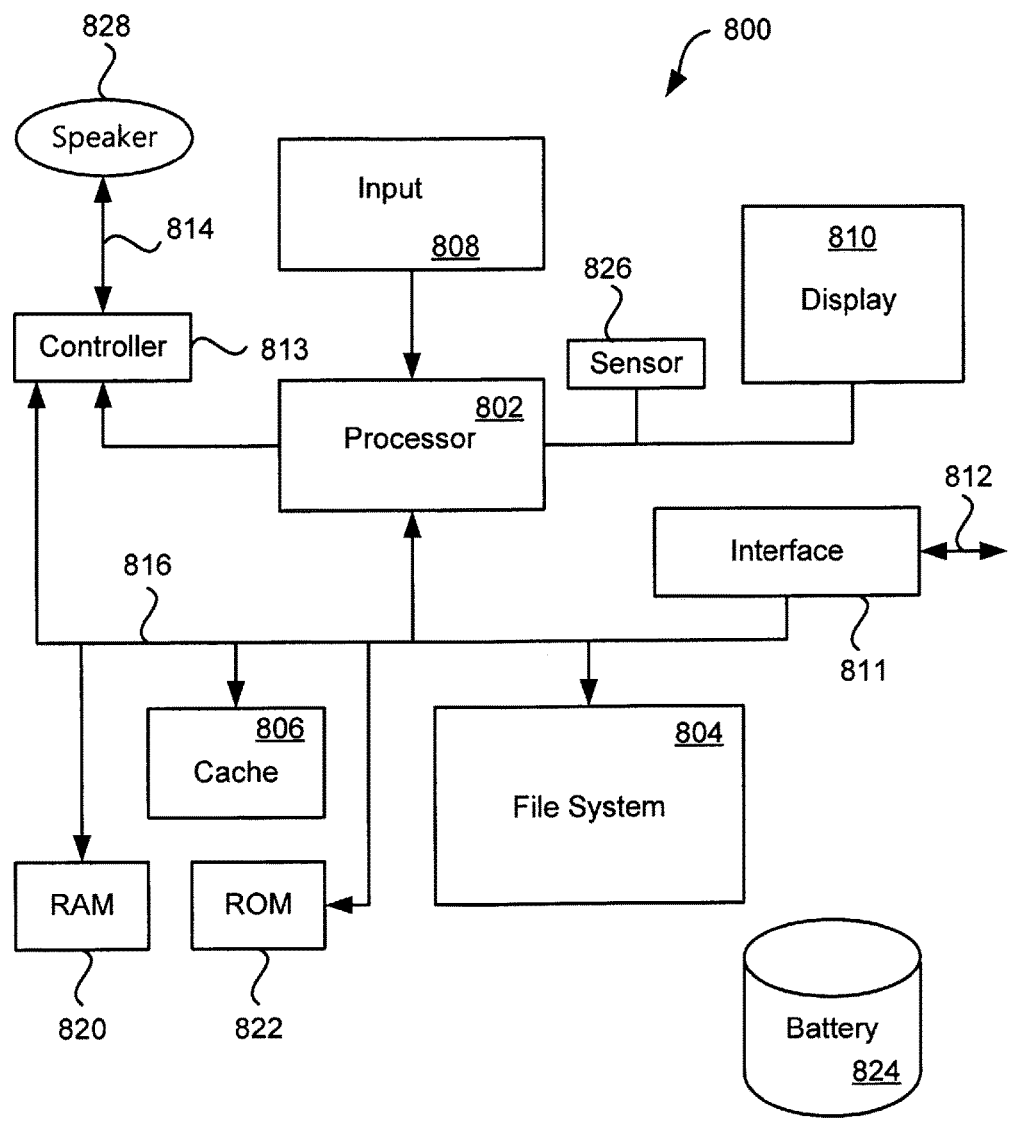
FIG. 8 shows a block diagram of an electronic device suitable for use with some example embodiments.

FIG. 8 is a block diagram of an electronic device suitable for controlling some of the processes in the described embodiment. Electronic device 800 can illustrate circuitry of a representative computing device. Electronic device 800 can include a processor 802 that pertains to a microprocessor or controller for controlling the overall operation of electronic device 800. Electronic device 800 can include instruction data pertaining to operating instructions, such as instructions for implementing and controlling a user equipment, in a file system 804 and a cache 806. File system 804 can be a storage disk or a plurality of disks. In some embodiments, file system 804 can be flash memory, semiconductor (solid state) memory or the like. The file system 804 can typically provide high capacity storage capability for the electronic device 800. However, since the access time for the file system 804 can be relatively slow (especially if file system 804 includes a mechanical disk drive), the electronic device 800 can also include cache 806. The cache 806 can include, for example, Random-Access Memory (RAM) provided by semiconductor memory. The relative access time to the cache 806 can be substantially shorter than for the file system 804. However, cache 806 may not have the large storage capacity of file system 804. Further, file system 804, when active, can consume more power than cache 806. Power consumption often can be a concern when the electronic device 800 is a portable device that is powered by battery 824. The electronic device 800 can also include a RAM 820 and a Read-Only Memory (ROM) 822. The ROM 822 can store programs, utilities or processes to be executed in a non-volatile manner. The RAM 820 can provide volatile data storage, such as for cache 806.

Electronic device 800 can also include user input device 808 that allows a user of the electronic device 800 to interact with the electronic device 800. For example, user input device 808 can take a variety of forms, such as a button, keypad, dial, touch screen, audio input interface, visual/image capture input interface, input in the form of sensor data, etc. Still further, electronic device 800 can include a display 810 (screen display) that can be controlled by processor 802 to display information, such as web pages, to the user. Data bus 816 can facilitate data transfer between at least file system 804, cache 806, processor 802, and input/output (I/O) controller 813. I/O controller 813 can be used to interface with and control different devices such as speakers, ear buds, microphone or video cameras through appropriate codecs. For example, control bus 814 can be used to control speaker 828.

Electronic device 800 can also include a network/bus interface 811 that couples to data link 812. Data link 812 can allow electronic device 800 to couple to a host computer or to accessory devices or to other networks such as the internet. The data link 812 can be provided over a wired connection or a wireless connection. In the case of a wireless connection, network/bus interface 811 can include a wireless transceiver, such as a wireless transceiver configured to transmit and receive data according to the LTE (Long Term Evolution) protocol. Sensor 826 can take the form of circuitry for detecting any number of stimuli. For example, sensor 826 can include any number of sensors for monitoring environmental conditions such as for example a Hall Effect sensor responsive to external magnetic field, an audio sensor, a light sensor such as a photometer, computer vision sensor to detect clarity, a temperature sensor and so on.

Figure 9:
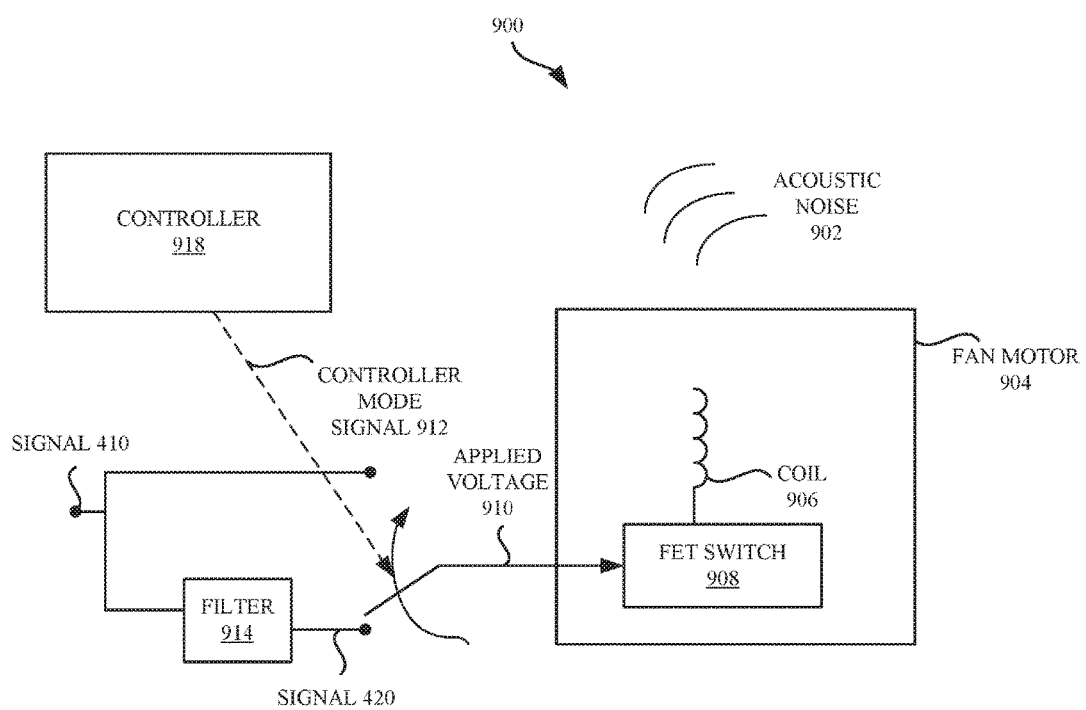
FIG. 9 illustrates a controller selecting a voltage to be applied to a fan motor to reduce an acoustic noise.

FIG. 9 shows an exemplary system 900 including a fan motor 904, a controller 918, and a filter 914. The fan motor 904 comprises a coil 906 and an FET switch 908. An acoustic noise 902 emanates from the fan motor 904. System 900 provides an embodiment of how slew rates of pulse voltage rise/fall can be reduced to minimize the acoustic noise. In particular, FIG. 9 illustrates the non-slew rate controlled input signal 410 that can be the basis of the slew rate controlled output signal 410 for reducing acoustic noise, in accordance with some example embodiments. Exemplary instances of the signals 410 and 420 are illustrated in FIG. 4. The input signal 410, in some embodiments, is a square wave. The input signal 410 has no slew rate reduction (i.e., non-slew rate controlled). The input signal 410 can be used to generate the signal 420. The signal 420 is shown in FIG. 4 as a modified square wave pulse, where some corners of the square wave pulse have been rounded, because the slew rates of both the voltage rise and the voltage fall have been reduced. The signal 420 has slew rate reduction (i.e., slew rate controlled), so the acoustic noise is reduced. In one embodiment, a typical 3-phase BLDC motor control IC can include six FETs. The FETs control the application of voltage to the coils. The slew rate is controlled by the turning on and off of these six FETs. FET switch 908 of FIG. 9 is exemplary. System 900 of FIG. 9 illustrates the exemplary filter 914. In some embodiments, filter 914 comprises a resistor and a capacitor to control the voltage applied to the gate of FET switch 908. Filter 914 may also correspond to operation of an op-amp circuit as previously described. In one embodiment, this filter would be enabled during the startup sequence by the controller mode signal 912 so that the applied voltage 910 corresponds to the slew-rate-reduction signal 420 output by the filter 914. Filter 914 is bypassed based on the controller mode signal 912 during high speed running operation.

The various aspects, embodiments, implementations or features of the described embodiments can be used separately or in any combination. Various aspects of the described embodiments can be implemented by software, hardware or a combination of hardware and software. Some of the described embodiments can also be embodied as computer readable code on a non-transitory computer readable medium. The computer readable medium is defined as any data storage device that can store data which can thereafter be read by a computer system. Examples of the computer readable medium include read-only memory, random-access memory, CD-ROMs, HDDs (hard disk drives), SSDs (solid-state drives), DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for reducing acoustic noise output by a fan motor, wherein the fan motor comprises a coil, the method comprising:
when the fan motor is starting up from an off state:
filtering a first pulse of a square wave with a filter to produce a first modified square wave pulse, wherein: i)

the first modified square wave pulse has rounded corners, and ii) a shape of the rounded corners is determined by the filter, providing the first modified square wave pulse to the coil of the fan motor, wherein the first modified square wave pulse reduces the acoustic noise output by the fan motor;

filtering a second pulse of the square wave with the filter to produce a second modified square wave pulse, wherein the second modified square wave pulse and the first modified square wave pulse have different widths, and providing the second modified square wave pulse to the coil of the fan motor.

2. The method of claim 1 wherein:

when the fan motor has reached a predetermined maximum speed operating state:

providing a third pulse of the square wave to the coil of the fan motor without filtering the third pulse, wherein an air flow during the predetermined maximum speed operating state masks the acoustic noise output by the fan motor.

3. The method of claim 2, wherein:

i) the providing the second modified square wave pulse to the coil is based on a first state of a controller mode signal, wherein the first state corresponds to the fan motor rotating at a predetermined minimum speed, and ii) the providing the third pulse of the square wave to the coil is based on a second state of a controller mode signal, wherein the second state corresponds to the fan motor predetermined maximum speed operating state.

4. The method of claim 1, wherein the fan motor is a brushless direct current (BLDC) fan motor.

5. The method of claim 1, further comprising:

causing a current waveform of the coil of the fan motor to comprise a sinusoidal waveform in response to the first modified square wave pulse and the second modified square wave pulse, wherein the acoustic noise output by the fan motor is reduced by the current waveform comprising the sinusoidal waveform.

6. The method of claim 5, further comprising:

when the fan motor is starting up from the off state:

operating the fan motor according to an open-loop configuration.

7. A method for reducing acoustic noise output by a fan motor using a pulse width modulated (PWM) voltage waveform, the method comprising:

generating a variable pulse width PWM voltage waveform; and receiving by the fan motor when the fan motor is transitioning from an off state, the variable pulse width PWM voltage waveform until the fan motor reaches a predetermined operating state, wherein:

i) the variable pulse width PWM voltage waveform is the output of a filter, ii) the variable pulse width PWM voltage waveform comprises a first modified square wave pulse with rounded corners and a second modified square wave pulse with rounded corners, iii) a shape of the rounded corners is determined by the filter, iv) the variable pulse width PWM voltage waveform reduces the acoustic noise output by the fan motor, and v) the second modified square wave pulse and the first modified square wave pulse have different widths.

8. The method of claim 7, wherein the variable pulse width PWM voltage waveform causes a current waveform of a coil of the fan motor to comprise a sinusoidal waveform.

9. The method of claim 7, wherein the variable pulse width PWM voltage waveform includes at least two pulses having different widths.

10. The method of claim 7, wherein the predetermined operating state corresponds to a predetermined fan motor speed.

11. The method of claim 7, further comprising:

when the fan motor is transitioning from the off state:

operating the fan motor according to an open-loop configuration.

12. The method of claim 11, further comprising:

when the fan motor reaches the predetermined operating state:

operating the fan motor according to a closed-loop configuration.

13. A system for reducing acoustic noise output by a fan motor using a pulse width modulated (PWM) voltage waveform, the system comprising:

the fan motor; and a motor controller connected to the fan motor, the motor controller configured to:

provide a variable pulse width PWM voltage waveform to the fan motor (i) when the fan motor is starting up from an off state and (ii) until the fan motor reaches a predetermined operating state, wherein:

a) the variable pulse width PWM voltage waveform is the output of a filter, b) the variable pulse width PWM voltage waveform comprises a first modified square wave pulse with rounded corners and a second modified square wave pulse with rounded corners, c) a shape of the rounded corners is determined by the filter, d) the variable pulse width PWM voltage waveform reduces the acoustic noise output by the fan motor, and e) the second modified square wave pulse and the first modified square wave pulse have different widths.

14. The system of claim 13, wherein the motor controller is further configured to:

cause a current waveform of a coil of the fan motor to comprise a sinusoidal waveform in response to the fan motor receiving the variable pulse width PWM voltage waveform, wherein the acoustic noise output by the fan motor is reduced by the current waveform comprising the sinusoidal waveform.

15. The system of claim 13, wherein the motor controller is further configured to:

activate an operation for adjusting a slew rate of the at least two pulses when the fan motor is starting up from the off state; and deactivate the operation when the fan motor reaches the predetermined operating state.

16. The system of claim 13, wherein the predetermined operating state corresponds to a predetermined fan motor speed.

* * * * *